United States Patent
Kanta

[19]

[11] Patent Number: 5,967,544
[45] Date of Patent: Oct. 19, 1999

[54] UTILITY CART

[76] Inventor: George E. Kanta, Kanta Products, Inc., Box 335, Three Forks, Mont. 59752

[21] Appl. No.: 09/038,098

[22] Filed: Mar. 11, 1998

Related U.S. Application Data

[60] Provisional application No. 60/053,802, Jul. 25, 1997.

[51] Int. Cl.⁶ .................................................. B62B 1/00
[52] U.S. Cl. ..................... 280/652; 280/654; 280/47.24; 280/47.26; 280/47.33; 280/47.29
[58] Field of Search ................................... 280/652, 654, 280/47.18, 47.19, 47.29, 47.28, 47.24, 47.26, 47.33; 297/423.11; 182/230

[56] References Cited

U.S. PATENT DOCUMENTS

| | | | |
|---|---|---|---|
| D. 180,868 | 8/1957 | Diehl | D14/3 |
| D. 278,373 | 4/1985 | Rousseau | D34/26 |
| D. 303,883 | 10/1989 | Higson | D6/429 |
| 2,835,503 | 5/1958 | Humphries et al. | 280/47.19 |
| 3,041,084 | 6/1962 | Stehman | 280/47.24 |
| 3,166,339 | 1/1965 | Earley | 280/654 |
| 4,350,366 | 9/1982 | Helms | 280/655 |
| 4,394,049 | 7/1983 | Ward | 297/439 |
| 4,460,188 | 7/1984 | Maloof | 280/30 |
| 4,469,341 | 9/1984 | Creim | 280/47.26 |
| 4,521,030 | 6/1985 | Vance | 280/42 |
| 4,846,486 | 7/1989 | Hobson | 280/47.25 |
| 5,203,815 | 4/1993 | Miller | 43/21.2 |
| 5,380,033 | 1/1995 | Harling | 280/654 |
| 5,464,104 | 11/1995 | McArthur | 211/133 |

FOREIGN PATENT DOCUMENTS

| | | | |
|---|---|---|---|
| 2 584 358 | 1/1987 | France | 280/47.19 |
| 2 247 650 | 3/1992 | United Kingdom | 280/47.33 |

*Primary Examiner*—J. J. Swann
*Assistant Examiner*—Andrew J. Ririe
*Attorney, Agent, or Firm*—Richard C. Litman

[57] ABSTRACT

The present invention is a structurally stable utility cart having a collapsible kneeling board to cushion the knees of the user and a collapsible hand support that the user can grab hold of when shifting to and from kneeling or crouching positions to upright standing positions. The kneeling board and hand support are independently collapsible without one affecting the movement of the other. Further, the device is readily collapsible for compact storage without substantially affecting the overall structural stability. The present invention also provides a utilitarian container, generally for storing various gardening tools.

20 Claims, 4 Drawing Sheets

UTILITY CART

CROSS-REFERENCE TO RELATED APPLICATION

This application claims the benefit of U.S. Provisional Patent Application Ser. No. 60/053,802, filed Jul. 25, 1997.

BACKGROUND OF THE INVENTION

1. Field of the Invention

The present invention relates to carts, and more particularly, to a highly stable utility cart adapted for gardening which provides a kneeling board and hand support which are both foldable.

2. Description of Related Art

There are many bodily positions to which gardeners must contort themselves in their pursuit of the perfect landscape. In particular, gardeners frequently change from kneeling or crouching positions to upright positions and vice versa. The kneeling position is particularly painful to the knee caps, especially on hard or rocky surfaces. Crouching, the alternative lowering position, is also uncomfortable since long periods in this position tend to limit blood circulation to the lower extremities. Moreover, gardeners frequently have to reach and extend themselves under imbalanced conditions in order to beautify or improve the landscape while contouring the land, planting, or pruning flowers, shrubs and trees. The constant shifts between the above-mentioned positions, without some type of support, can lead to back ailments. Therefore, a cart having support features in addition to the capability to carry a wide array of instruments is desired.

Although some carts have been adapted for use by gardeners, the carts are generally directed only toward carrying gardening tools, such as shears, pruners, hoes, and the like, and not as a support for the gardener. Moreover, collapsible utility carts, including all of the relevant art discussed below, are generally unstable, particularly in the collapsed position. Although collapsing the cart has the advantage of compact storage, such prior devices lack the capability of accomplishing the multiple needs as described above.

Considering the elevational side view of a typical prior cart, the cart generally has a main carriage with a wheeled single axle resting in a vertical plane offset from a vertical axis passing through the center of gravity of the carriage. Though offset, this vertical axis generally rests very close to the vertical plane of the axle, resulting in a cart that is easily tipped from the standing position by passing the center of gravity through the vertical plane. Carts are so designed to easily lift heavy loads placed in the carriage; but such designs sacrifice stability and therefore are not useful as a support structure for the gardener. Collapsing the collapsible portions of such a device usually substantially worsens this problem, as the center of gravity is then shifted even closer to the vertical axis of the axle.

Accordingly, a need will be seen for a structurally stable cart adapted for gardening use that maintains the above described mechanical advantages, yet provides comfortable supports on which the user may rest his knees, and additional supports to assist the user in raising or lowering himself in and out of the kneeling position without fear of upsetting the cart. In addition, the cart should be easily compacted for storage in limited space.

Prior patents showing utility carts include U.S. Pat. No. 5,203,815 issued to Miller on Apr. 20, 1993, describing an apparatus for carrying fishing equipment. The purpose of the device discloses an interlinked collapsible pair of shelves for storing fishing equipment. Unlike the present invention, due to the inter-linkage of the shelves the device does not provide independent utilization of each shelf unit limiting its adaptability for use as a personal support.

U.S. Pat. No. 4,460,188 issued to Maloof on Jul. 17, 1984 describes a cart with a seat, storage compartment and multi-position foldable backrest. Unlike the present invention, this device does not provide a kneeling board and hand support suitable for use during garden work. Moreover, the cart can be easily tipped over if used as a crutch.

U.S. Pat. No. 4,521,030 issued to Vance on Jan. 4, 1985 describes a collapsible and slidable cart for transporting groceries, packages, and the like. This device does not provide a kneeling board and hand support as in the present invention.

U.S. Pat. No. 2,835,503 issued to Humphries et al on May 20, 1958 describes a garden tool cart. This device is specifically designed to have the center of gravity of a load rest near the vertical plane passing through the wheels, permitting easy movement but sacrificing stability.

French Patent Application FR 2 584 358 of Demnard, published on Jan. 9, 1987 describes a two-wheeled trolley with foldable racks for compact storage. This device would be highly unstable and dangerous for use as a support during garden work.

British Patent Application GB 2 247 650 A of Tanner, published on Mar. 11, 1992 discloses a complicated garden trolley device which has numerous structures around its single handle. The center of gravity of this device is relatively high. Furthermore, in its collapsed position, this device can easily be tipped.

None of the above noted inventions and patents, taken either singly or in combination, is seen to describe the instant invention as claimed.

SUMMARY OF THE INVENTION

The present invention is a structurally stable utility cart that is inexpensive to manufacture and easy to use. In addition, the present invention provides a collapsible kneeling board to cushion the knees of the user, and, a collapsible hand support that the user can grab hold of when shifting to and from kneeling or crouching positions to upright standing positions. The kneeling board and hand support are independently collapsible without affecting the movement of the other. The kneeling board can also be utilized as a seat. Further, the device is readily collapsible for compact storage, without substantially affecting the overall structural stability. The present invention also provides a utilitarian container, generally for storing various gardening tools.

Accordingly, it is a principal object of the present invention to provide a utility cart that is structurally stable.

Another of the objects of the present invention is to provide a utility cart with an independent foldable hand support to assist the user in raising or lowering himself.

Yet another of the objects of the present invention is to provide a utility cart with an independent foldable kneeling board.

A further object of the present invention is to provide a utility cart that is particularly adapted for use in gardening.

Still another object of the present invention is to provide a utility cart which is economical to produce.

Yet another object of the present invention is to provide a utility cart that can receive containers, such as tool boxes, of many configurations and capacities.

Another object of the present invention is to provide a utility cart that is readily collapsed for storage in limited spaces.

A final object of the present invention is to provide a utility cart that retains its structural stability when the device is collapsed.

These and other objects of the present invention will be more readily apparent as the nature of the invention is herein after more fully described, illustrated and claimed with reference being made to the attached drawings.

DETAILED DESCRIPTION OF THE PREFERRED EMBODIMENTS

Figure 1:
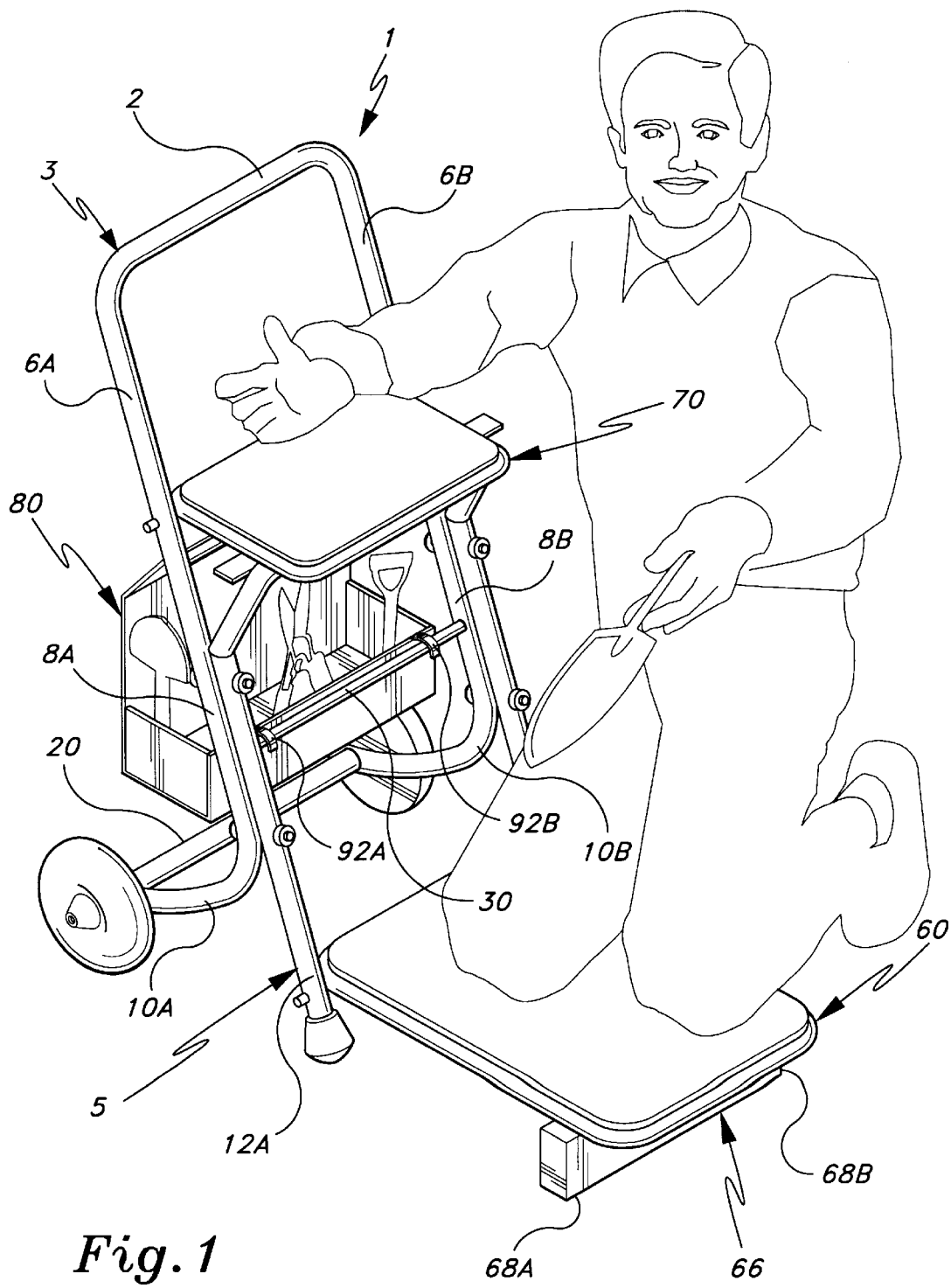
FIG. 1 is an environmental perspective view of the utility cart with both the hand rest and kneeling support in unfolded positions.

The device of the applicant's invention is a structurally stable cart which is adapted for use in gardening. Embodiments of the aspects of the present invention will now be explained with reference to the accompanying drawings. By way of illustration and not limitation, FIGS. 1 to 4 are presented to show the preferred embodiments of the applicant's invention.

In one embodiment of the present invention, the utility cart 1 includes a rigid main frame structure 3, preferably constructed of tubular steel, comprising integral portions, namely a handle portion 2, a pair of upper extensions 6a, 6b, a pair of lower extensions 8a, 8b and a pair of curved extensions 10a, 10b. At its uppermost limit, the frame 3 includes the horizontal handle portion 2 with two opposite ends. The pair of upper extensions 6a, 6b each extend vertically downward at an acute angle from either end of the handle portion 2. Each of a pair of lower extensions 8a, 8b further extend downward from their respective upper extension 6a, 6b following the same path as the upper extension. Each of the pair of curved extensions 10a, 10b arch downward from their respective lower extensions 8a, 8b to complete a generally symmetrical structure having a mirrored "J" configuration.

To make the frame mobile, an axle and wheel assembly is provided. An axle housing 20 interconnects the ends of the curved extensions 10a, 10b, forming a highly rigid frame structure 3. An axle 22 is housed in the axle housing 20. A pair of wheels 26a, 26b, including tires that are preferably made of rubber or rubber-like material, is rotatably attached to the axle 22. Means to reduce friction (not shown), such as ball or journal bearings, may be included in the axle and/or wheels.

Strengthening braces complete the frame 3. A lower brace member 30 is preferably made of tubular steel, as are most elongated parts of the present invention. The lower brace member 30 has two opposing ends, each welded to either lower extension 8a, 8b, thus further strengthening the main frame structure 3, as can be best appreciated from FIGS. 1 and 4. An upper brace member 32 is similarly attached, preferably to the upper extensions 6a, 6b of the main support structure, as shown in FIG. 2. The braces 30, 32 complete a durable main frame structure 3, capable of supporting the weight of a gardener.

In addition to having a rigid frame, the cart is provided with a brace which allows the cart to rest on a surface in a stable manner. When viewed relative to the main frame 3, a main leg structure 5 completes a "Y" configuration, and thereby forms a support for a pivoted upper arm rest frame 70.

The main leg structure 5, preferably made of tubular steel, includes a horizontal rest extension 19, as best seen in FIG. 2 joining a pair of integral portions 18a, 18b extending in a substantially downward direction from the ends of the rest extension 19 toward the leg structure 5. At a point between the upper extensions 6a, 6b and the lower extensions 8a, 8b, each portion 18a, 18b joins one of a pair of upper elongations 16a, 16b, each preferably tubular. Each elongation 16a, 16b extends substantially downward from the integral portions 18a, 18b, contiguously along the lower extensions 8a, 8b of the main frame structure 3, and is attached thereto by an upper and lower securing means 106a, 106b, 108a, 108b. In one embodiment of the present invention, the securing means are bolts that are threaded into the main frame structure 3 and the main leg structure 5 respectively, to form a highly rigid overall structure. In another embodiment, the two structures 3,5 are welded together. A pair of lower elongations 12a, 12b integrally extend in the same downward direction from the upper elongations 16a, 16b, and terminate generally in the same plane as the wheel and axle assembly, thereby forming a pair of legs for the cart. A pair of shoes 50a, 50b caps off the ends of the lower extensions 12a, 12b, to absorb wear and increase surface contact.

Pivotally attached between the lower extensions 12a, 12b is a lower rest frame 60, preferably rectangular in shape and dimensioned to pass between the leg structure 5. A first hinging means, preferably a pin terminating at ends 102a, 102b, rotatably attaches the lower rest frame 60 to the lower elongations 12a, 12b of the main support structure 3, to enable the lower rest frame 60 to be folded in and out of the main leg structure 5. The lower rest frame 60 is spanned by a panel having top and bottom surfaces 62a, 62b. The top surface 62a is padded to cushion the knees of the user. A foot bar 66, having first and second ends 68a, 68b, is attached to the lower rest frame 60 adjacent the bottom surface 62b of the lower rest frame 60. The foot bar 66 is intended to rest on a ground surface when the lower rest frame 60 is rotated to an open position, elevating and supporting the lower rest frame 60 for kneeling. The foot bar 66 is dimensioned to extend beyond the rest frame 60 to define first and second ends 68a, 68b which engage the upper elongations 16a, 16b while the frame 60 is in a folded or compact position (as shown in FIG. 2), wherein the first and second ends 68a, 68b limit further movement of the lower rest frame 60.

An upper rest frame 70, intended for use as an arm rest, is pivotally attached to the upper extensions 6a, 6b of the main support structure. The upper rest frame 70 is preferably rectangular in shape and dimensioned to fit between upper extensions 6a, 6b, the frame spanned by a panel having top and bottom surfaces 72a, 72b. The top surface 72a of the upper rest frame 70 is preferably made of a non-slippery material such as grooved plastic, and may have swirl patterns similar to fingerprints. A second hinge means 100a, 100b, also preferably in the form of a pin, rotatably attaches the upper rest frame 70 to the upper extensions 6a, 6b of the main frame structure 3, to enable the upper rest frame 70 to be folded in and out of the main frame structure 3. A rigid support bar 75 is fixedly attached to the upper rest frame 70 adjacent the bottom surface 72b, the bar 75 extending beyond the frame to define left and right lip extensions 76a, 76b. In a folded position, both the left and right lip extensions 76a, 76b of the support bar 75 abut the upper extensions 6a, 6b and limit further movement of the upper rest frame 70. The support bar also reinforces the rigidity of the upper rest frame 70.

A container 80 is included for carrying objects such as gardening tools, attached to upper brace member 32 and lower brace member 30 by attachment means 92a, 92b, 95a, 95b. It is preferred that the attachment means are hooks such as those shown in FIGS. 2 and 4. The hooks detachably secure the container 80 to the braces so that the user may use remove the container for the cart for temporarily transporting the container and its held objects. Although attaching the container 80 to only one of the brace members 30, 32 would adequately secure the container 80 to the cart 1, it is preferred that the container 80 is attached to both brace members 30, 32. Provided the container 80 is secured properly onto the brace members 30, 32, the container 80 can potentially be sized and shaped to carry numerous articles of various sizes and weights.

Figure 2:
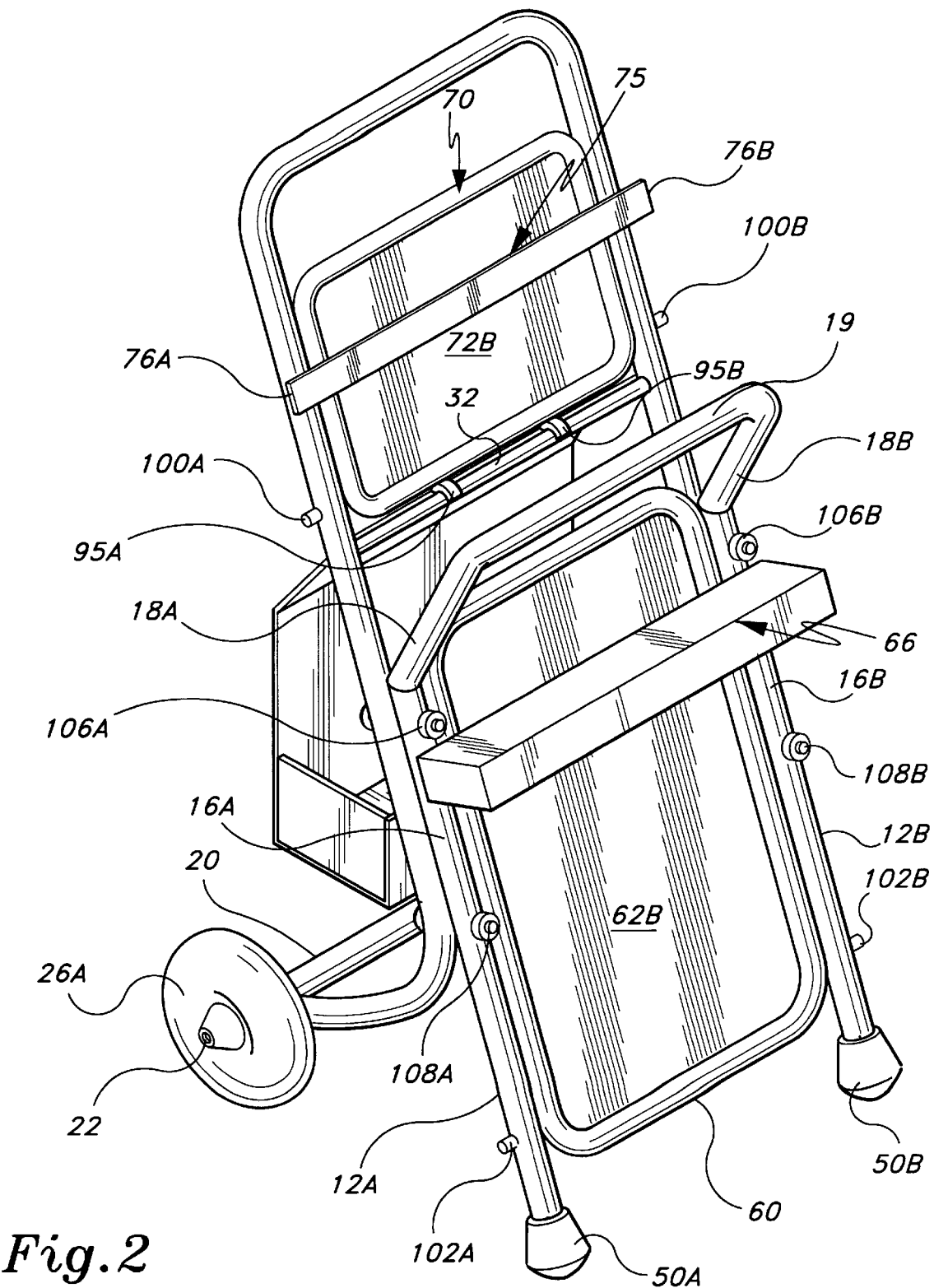
FIG. 2 is a perspective view of the utility cart with the hand rest and kneeling support folded.

FIG. 1 is an environmental perspective view of the present invention illustrating the basic use of the present invention. The cart 1 is shown with both the upper rest frame 70 and lower rest frame 60 in fully unfolded positions. The user will typically kneel on the upper surface 62a of the lower rest frame 60. It is preferred that the upper surface 62a of the lower rest frame 60 is padded to reduce discomfort to the user. This kneeling position permits the user to comfortably access plants, shrubs, flowers and the like that are close to the ground.

While kneeling, the upper rest frame 70 may be folded into the main frame structure 3 while not in use as an arm rest, to permit a greater degree of movement by the user. It is preferred that, when the user wishes to stand up, the upper rest frame 70 is unfolded to engage the rest extension 19. The user places his hand or arm on the upper surface 72 of the upper rest frame 70, using the frame 70 as a "crutch" to give the user better leverage in raising himself to an upright standing position. This process can be reversed when the user wants to lower himself. Alternatively, when the upper rest frame 70 is folded into the main frame structure 3, the rest extension 19, by itself, could be used as an alternative "crutch."

Figure 3:
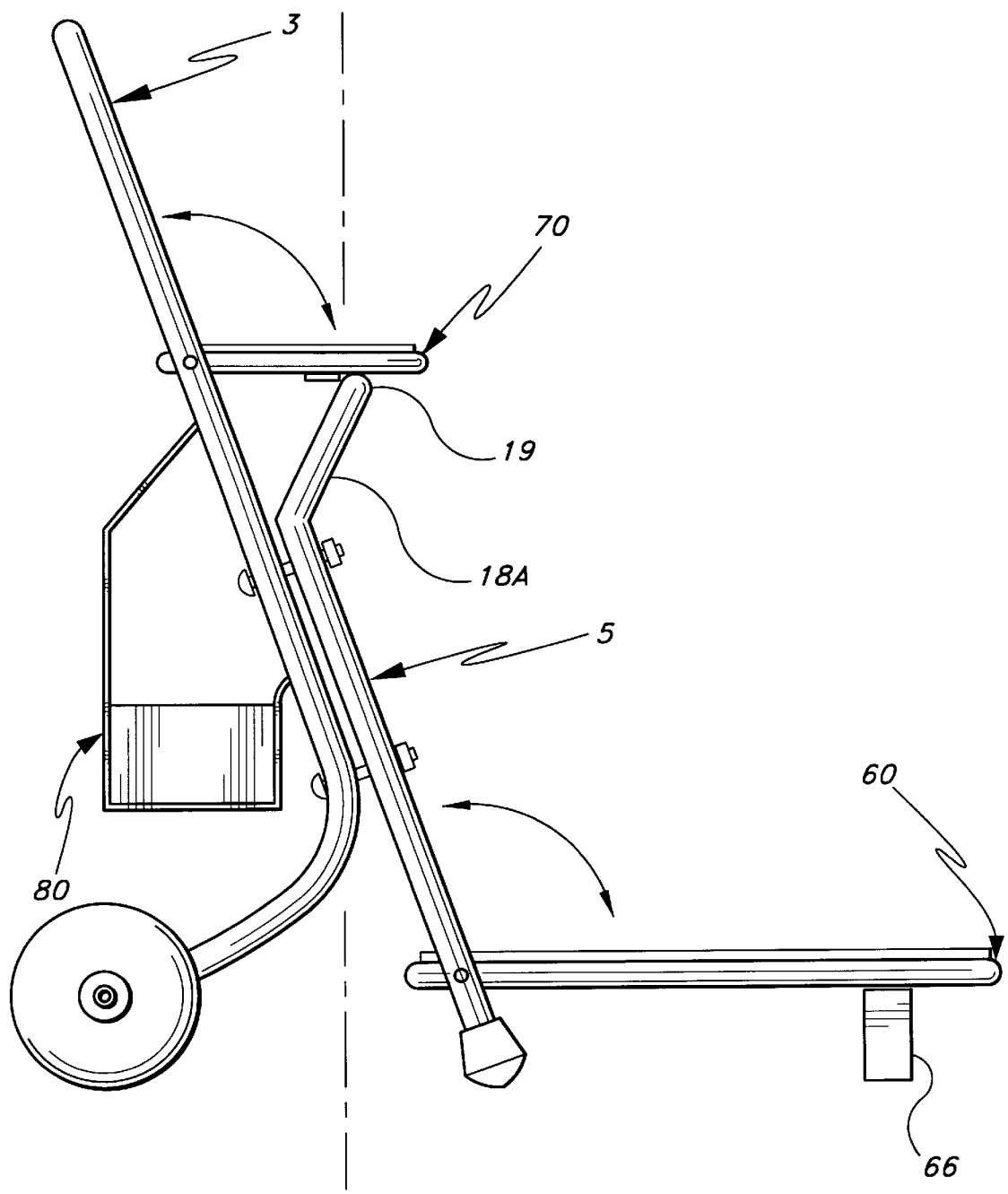
FIG. 3 is a side elevational view of the utility cart indicating a center line for the center of gravity (C.G.).
Figure 4:
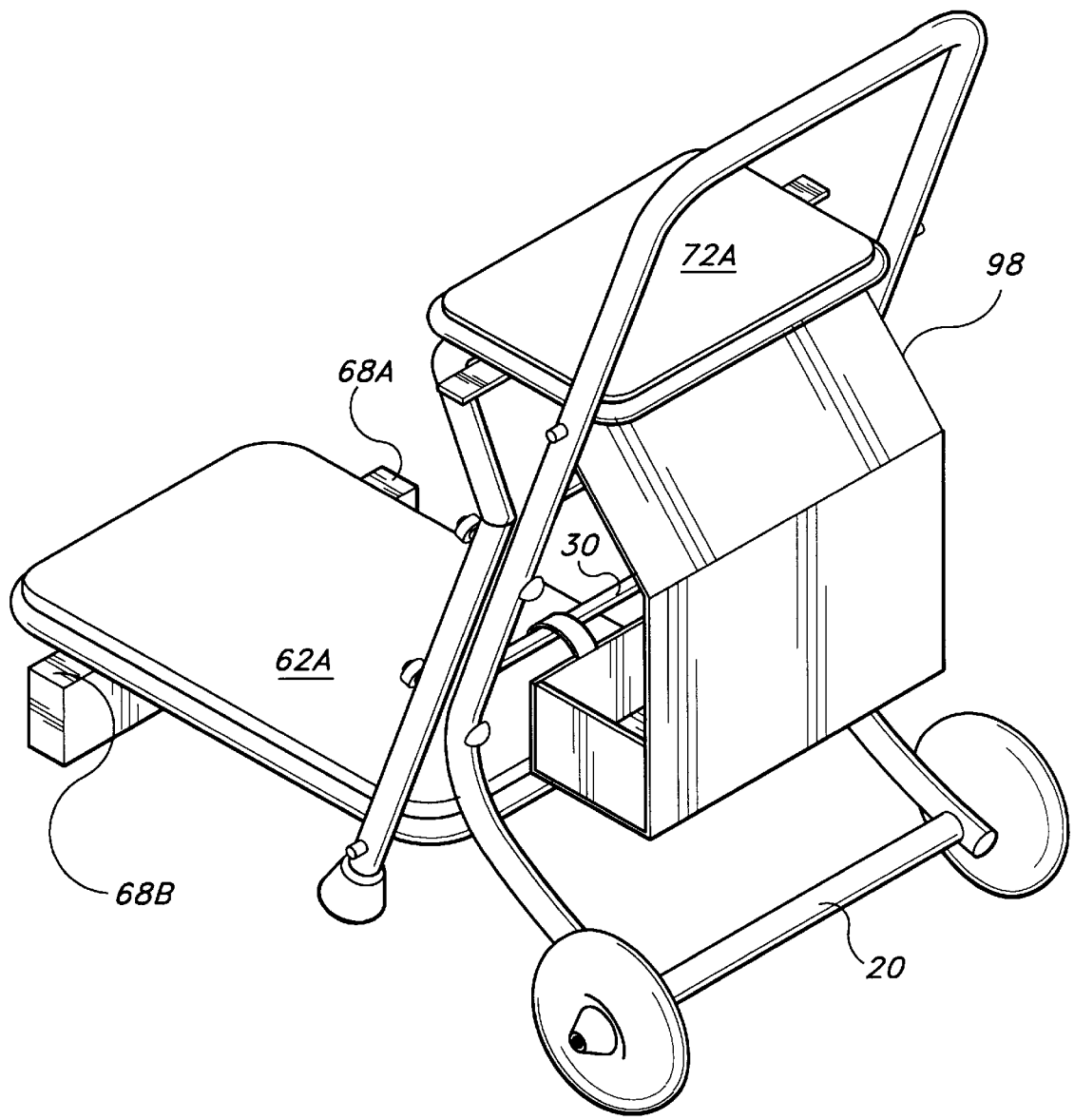
FIG. 4 is a reverse perspective view of the utility cart in FIG. 1.

FIG. 3 is an elevated side view of the present invention from which the principles behind the stability of the cart can be understood. A vertical line identified "C.G." (Center of Gravity) lies in a position that is located roughly equidistant between the vertical plane passing through the center of the wheels 26a, 26b and a second plane passing through the shoes 50a, 50b. When the vertical axis of the center of gravity of the present invention is near the "C.G." line, as shown in FIG. 3, the overall structure will be substantially balanced and stable, allowing a user to raise or lower himself using the upper rest frame 70 or the rest extension 19 while kneeling on the lower frame 60, without the cart tipping over, because the user does not pass the center of gravity through the plane passing through the wheels.

Even when both the upper and lower rest frames 70, 60 are folded into the main frame structure 3, the center of gravity will not be shifted significantly to affect the overall stability of the structure. Hence, the present invention can be stored in this position without having to buttress the cart against a wall for storage, as is generally the case for many prior carts.

Moreover, the vertical axis of the center of gravity of the container 80 and its contents preferably should lie between the vertical plane passing through the wheels 26a, 26b and the plane passing through the C.G. line. Thus, despite increased loads on the container due to additional tools and other articles, it remains relatively easy for the user to transport the increased load because the center of gravity of the whole entity (the cart, container and its contents) can be passed through the vertical plane passing through the wheels.

It is therefore apparent that, if a heavy load is carried in the container 80, it is preferred that the container 80 and its heavy contents be removed before the user utilizes the upper rest frame 70 or the rest extension 19 to support his weight as he raises or lowers himself. Taking this precaution will shift the center of gravity of the cart to a more stable position.

It is to be understood that the present invention is not limited to the embodiments described above, but encompasses any and all embodiments within the scope of the following claims.

I claim:

1. A utility cart comprising:
   a main frame comprising:
      a pair of generally parallel "J"-shaped members each including a top portion, a straight portion, and a hook portion;
      a handle fixedly joined between each top portion of said "J"-shaped members;
      an axle housing fixedly joined between each said hook portion of said "J"-shaped members;
      an axle housed in said axle housing;
      a pair of wheels attached to said axle;
      a pair of extensions each attached to, and extending linearly downward from, said straight portions of each of said "J"-shaped members whereby each associated said hook portion and said extension diverge and said extension having a ground contacting portion;
   a kneeling board having an upper surface and a lower surface and including a board hinging portion;
   a first hinge means for rotatably attaching said board hinging portion onto each said extension;
   a hand rest having an upper and lower surface including a rest hinging portion;
   a second hinge means for rotatably attaching the rest hinging portion onto the straight portions of said "J"-shaped members;
   a first counter-rotative means for preventing over rotation of said kneeling board beyond the desired amount of rotation when said board is fully folded;
   a second counter-rotative means for preventing over rotation of said hand rest, beyond the desired amount of rotation when said hand rest is fully folded or unfolded;
   securing means for securing said hand rest in a substantially horizontal position;
   a container; and
   attaching means for detachably attaching said container onto said main frame;
   wherein said kneeling board and said hand rest are coplanar with said pair of extensions in the folded position.

2. A utility cart as in claim 1, wherein the vertical plane passing through the center of gravity of said cart is substantially equidistant from the ground contacting surface of said wheels and said ground contacting portion of said extensions.

3. A utility cart as in claim 2, wherein each of said ground contacting portions of said extensions includes a shoe.

4. A utility cart as in claim 3, further comprising padding upon said upper surface of said kneeling board.

5. A utility cart as in claim 4, wherein said upper surface of said hand rest is textured.

6. A utility cart as in claim 5, wherein said first and second hinge means are pins.

7. A utility cart as in claim 6, wherein said kneeling board further includes a first extender adjacent said lower surface contacting said main frame when said kneeling board is in the folded position, preventing said board from folding further into the main frame structure; and said first counter-rotative means including said first extender.

8. A utility cart as in claim 7, wherein said hand rest includes a second extender adjacent said lower surface of said hand rest and engaging said main frame when said hand rest is in the folded position, preventing said hand rest from folding further into said main frame structure; wherein
said second counter-rotative means including said second extender.

9. A utility cart as in claim 8, wherein said securing means for detachably securing said hand rest in a substantially horizontal position includes a rest extension that extends from said main frame such that when said hand rest is unfolded, said hand rest engages said rest extension such that said upper surface of said hand rest is substantially horizontal.

10. A utility cart as in claim 9, wherein said main frame structure includes a first brace member connecting said "J"-shaped members, providing additional stiffness to said main frame.

11. A utility cart as in claim 10, wherein said main frame structure includes a second brace member, above said first brace member, connecting said "J"-shaped members, providing additional stiffness to said main frame.

12. A utility cart as in claim 11, wherein said attaching means for detachably attaching said container onto said cart, include hook members adapted for engaging said first brace member.

13. A utility cart as in claim 11, wherein said attaching means for detachably attaching said container onto said cart, include hook members adapted for engaging said first and second brace members.

14. A utility cart comprising:
a main frame structure comprising:
a handle portion having opposite ends,
a pair of upper extensions extending vertically downward at an acute angle, from the opposite ends of the handle portion,
a pair of lower extensions each having a first and second end, further extending downwards from their respective upper extensions,
a pair of curved extensions arching downwardly from their respective lower extensions to complete a structure that is a substantially "J"-shaped configuration which has been slightly pivoted,
an axle housing that interconnects the ends of said curved extensions,
an axle housed in said axle housing,
a pair of wheels rotatably attached to said axle,
a lower brace member connecting said lower extensions, and
an upper brace member connecting said upper extensions of said main support structure;

a main leg structure comprising:
a rest extension having opposite ends,
a pair of inclined portions extending in a substantially downward direction from said opposite ends of said rest extension toward a point between said upper extensions and said lower extensions,
a pair of upper elongations extending downward from said inclined portions, adjacent said lower extensions,
a pair of lower elongations further extending parallel to said upper elongations, and
a pair of end caps coupled with the second end of each of said lower elongations;

a lower rest frame having a top surface and a bottom surface;

a foot bar, having a first end and a second end, attached to said lower rest frame adjacent said bottom surface of said lower rest frame;

a first hinge means for rotatably attaching said lower rest frame to said lower elongations of said main support structure, enabling said lower rest frame to be folded in and out of said main leg structure, with first end and said second end of said foot bar engaging said upper elongations in the folded position to prevent further movement of said lower rest frame;

an upper rest frame having a top surface and a bottom surface;

a support bar having left and right lip extensions, each fixedly attached to said upper rest frame adjacent said bottom surface of said upper rest frame;

a second hinge means for rotatably attaching said upper rest frame to said upper extensions of said main frame structure, enabling said upper rest frame to be folded in and out of said main frame structure, with said left and right lip extensions of said support bar catching said upper extensions of said main frame structure in the folded position to prevent further movement of said upper rest frame;

upper and lower securing means, for attaching said main frame structure and said main leg structure together; and a container, having attaching means, for detachably securing said container onto said lower brace member and said upper brace member.

15. A utility cart as in claim 14 wherein the vertical plane passing through center of gravity of the cart is substantially equidistant to the ground contacting surface of said wheels and the ground contacting portion of said lower extensions.

16. A utility cart as in claim 15 further comprising padding upon said lower rest frame.

17. A utility cart as in claim 16 wherein said upper rest frame is textured.

18. A utility cart as in claim 17 wherein said first and second hinge means are pins.

19. A utility cart as in claim 18, wherein said attaching means for detachably attaching said container onto said cart, include hook members adapted for engaging said first brace member.

20. A utility cart as in claim 18, wherein said attaching means for detachably attaching said container onto said cart, include hook members adapted for engaging said first and second brace members.

* * * * *